April 18, 1939.　　I. L. CLAVE ET AL　　2,154,806
ICE CREAM DISPENSER
Filed June 3, 1938
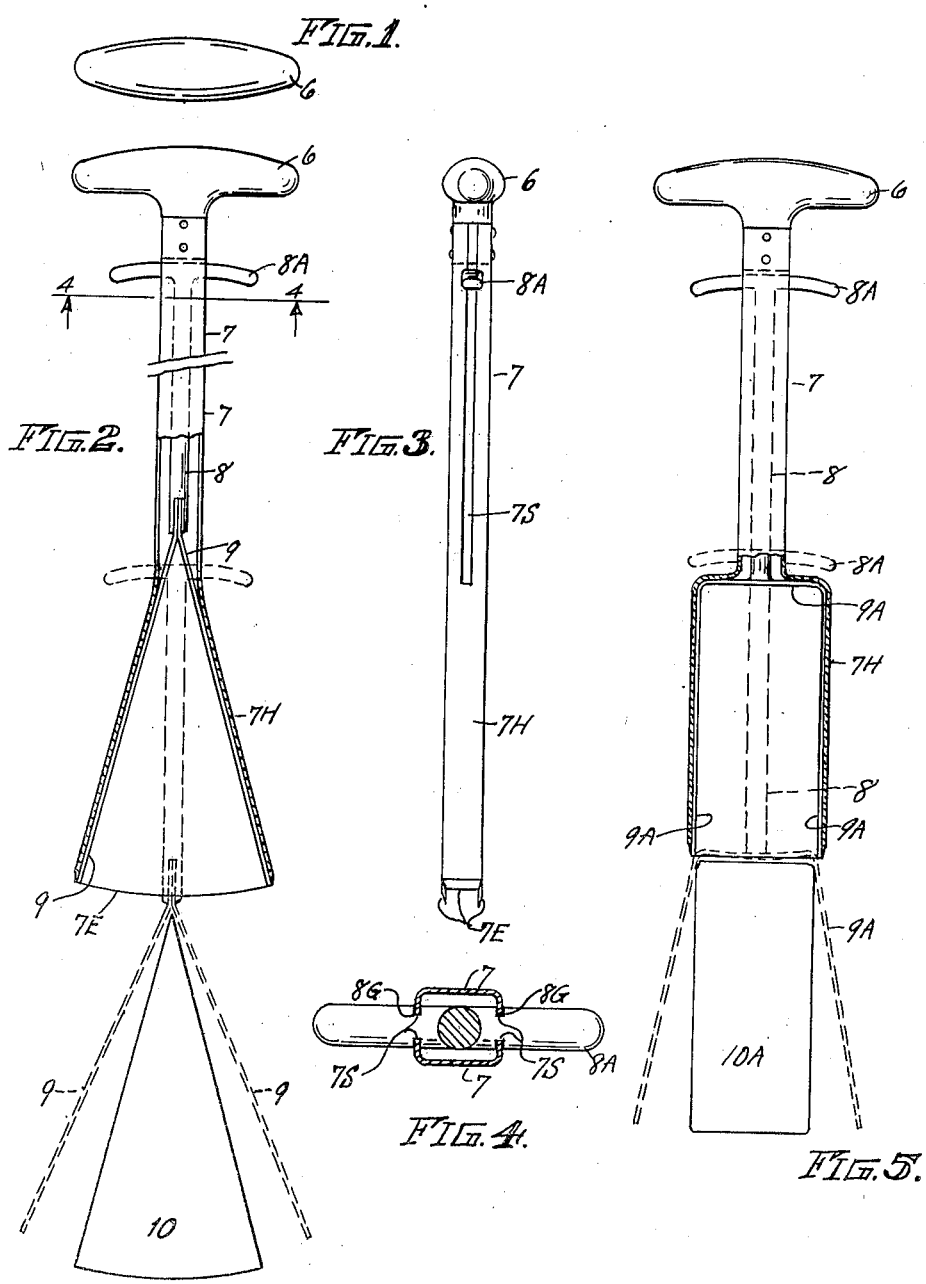

Patented Apr. 18, 1939

2,154,806

UNITED STATES PATENT OFFICE 2,154,806

ICE CREAM DISPENSER

Irene L. Clave and Alfred O. Clave,
St. Paul, Minn.

Application June 3, 1938, Serial No. 211,577

3 Claims. (Cl. 107—48)

This invention relates to dispensing devices in general and more particularly to a device for making slices of ice cream to be served as such but preferably in combination with other articles of food such as pie and cake, the said combinations hitherto known as pie a-la-mode or cake a-la-mode all well known in the food serving arts.

The main object of our invention is to provide a simple and highly efficient device designed to cut and form triangular or rectangular slices of ice cream, means being provided to subsequently expel or discharge the thus formed slice to lie upon a piece of pie or cake of corresponding shape. Hitherto, it is well known, ice cream has been served with other food products in no particular form, generally in semi-globular or pyramid shaped chunks of unwieldy shape and difficult to slice or cut with the same culinary implement used when consuming for example a piece of pie, or cake. Our device forms and ejects a flat slice of ice cream easily placed upon a piece of pie or the top area of a piece of cake the shape of said flat slice corresponding to the shape of the pie or cake, all as hereinafter fully set forth, reference being had to the accompanying drawing, in which;

Fig. 1 is a top view and Fig. 2 is a face view of our ice-cream slicer device, the lower half of Fig. 2 being sectional. Fig. 3 is an edge view of Fig. 2, and Fig. 4 is an enlarged sectional view as on line 4—4 in Fig. 2.

Fig. 5 is a modification of Fig. 2, showing means for cutting and expelling a quadrangular slice of ice cream, whereas in Figs. 1-4 inclusive the slicer shown makes and expels triangular ice cream slices.

Referring to the drawing by reference numerals, like characters designating corresponding parts in the various views—our device is preferably all metal which may include the T handle 6 at the top end of the device and from which extends downwardly integrally a tubular shank 7 a predetermined distance. From the lower end of shank 7 extends in common plane an integral flared and flattened housing 7H the wider and lower extremity of which is open and preferably arcuate as shown. The horizontally registering arcuate edge parts and the connecting end parts may be beveled to thus provide a continuous cutting edge 7E directed downwardly. The thickness of the housing 7H determines the thickness of slice to be cut and molded within the housing.

Within shank 7 and housing or cutting member 7H is reciprocally retained a projectible ice cream ejector comprising a rod 8 normally central and longitudinally disposed within the shank and having at its upper end a T-handle or finger piece 8A projecting both ways from the shank through a pair of registering slots 7S in opposite sides of the shank. At the lower end of rod 8 is retained the upper ends of a pair of leaf spring members 9 extending downwardly in inverted V form, said members 9 normally bearing outwardly against the side walls of housing 7H as in Fig. 2, when the ice-cream ejector is in retracted (or uppermost) position. The handle 8A is guided reciprocally in the slots 7S by providing it with grooves 8G engaged by the edge parts of shank 7 at its slits 7S (see Fig. 4).

Assuming now that the device is in readiness to cut and form a triangular slice of ice-cream, as shown in full lines in Fig. 2, the operator grasps handle 6 and may use one or more fingers of the same hand to hold member 8A in uppermost position, the device is directed downwardly to plunge or push the housing 7H downwardly into a quantity of ice cream until the interior of said housing is filled with cream up to the apex of the triangle formed by the opposite leaf springs 9 and the opening of the housing. Then the operator gives the device a slight twist to free the ice cream at and between the cutting edges 7E then withdraws the device, ice cream being retained within the housing. Then the device is held over a cut of pie and the ice cream ejected by sliding the members 6 and 8A apart thus moving the springs 9 out of the housing as to the dotted line position in Fig. 2 and releasing the slice of ice-cream designated 10 to lie on top of the piece of pie. It will be understood that the spring arms 9 normally have a spread greater than the opening of housing 7H and as they move out of the housing during ejection of the ice-cream they spring apart and free from the edge parts of the wedge shaped piece of ice cream with the arcuate outer parts of both in approximately registering positions. In other words the slice of ice cream conforms to the usual shape of a cut of pie and is laid on the latter to cover its upper surface.

After ejection of a slice of ice cream the ejector is simply drawn back to original position, ready to make another cut or slice.

In the modification Fig. 5, the head 7H is simply changed to rectangular form, open downwardly, and instead of two spring arms 9 a single piece two armed spring ejector member 9A of inverted U shape is used. There arms also spread outwardly when projected from the housing to release the slice of ice cream 10A but said slice in this case being of rectangular form and intended for serving ice-cream on top of a piece of cake and conforming in shape to a piece of cake cut in corresponding shape.

Mechanically it is of course possible to make the cutter heads and corresponding spring arms of different shapes and also interchangeable on standard shank 7 and rod 8 but the preferred embodiments of the invention for most practical uses has been illustrated and described. Other modifications may be made with the scope and spirit of our invention.

We claim:

1. An ice-cream slice making device comprising a vertically disposed housing opening downwardly and the edges thereof sharpened, a hollow, elongated shank extending integrally from the upper part of said housing and a hand-hold at the upper extremity of the shank, expansible spring means within the housing and normally contacting and bearing against opposite inside walls of the housing, a reciprocable rod within said shank and one end thereof secured to said spring members, means for reciprocating said rod and spring members to move the latter out of the open end of the housing.

2. The structure specified in claim 1 in which said housing is of flattened form and flaring downwardly from the shank, said spring means comprising a pair of flat spring metal arms retained in the lower end part of the reciprocable rod, extending thence downwardly in inverted V form and normally bearing outwardly to frictionally contact the opposite narrow walls of the housing and adapted to spread apart further when ejected from the housing for the purpose described.

3. The structure specified in claim 1, in which said housing is of flattened form and extending integrally from the shank in common plane, said housing of quadrangular form and opening downwardly, an inverted U-shaped flat spring member reciprocably retained in said housing and the opposite parallel arms thereof normally in outward spring contact with the narrower interior wall areas of the housing and adapted to spread apart further when projected from the housing.

IRENE L. CLAVE.
ALFRED O. CLAVE.